(12) United States Patent
Tanizaki et al.

(10) Patent No.: US 7,248,965 B2
(45) Date of Patent: Jul. 24, 2007

(54) MAP INFORMATION SUPPLY DEVICE FOR MOBILE UNITS

(75) Inventors: Masaaki Tanizaki, Nishitokyo (JP); Kishiko Maruyama, Kokubunji (JP); Shigeru Shimada, Kodaira (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/827,441

(22) Filed: Apr. 20, 2004

(65) Prior Publication Data
US 2005/0102097 A1 May 12, 2005

(30) Foreign Application Priority Data
Nov. 10, 2003 (JP) ............................. 2003-379293

(51) Int. Cl.
*G01C 21/30* (2006.01)

(52) U.S. Cl. .................... 701/208; 701/25; 701/210; 701/212; 340/990; 340/995.15

(58) Field of Classification Search ............... 701/200, 701/201, 207, 208, 209, 210, 211, 23, 212, 701/25; 340/990, 995.15
See application file for complete search history.

(56) References Cited

U.S. PATENT DOCUMENTS

| | | | | |
|---|---|---|---|---|
| 6,049,753 | A * | 4/2000 | Nimura ...................... | 701/201 |
| 6,067,502 | A * | 5/2000 | Hayashida et al. ......... | 701/209 |
| 6,119,065 | A * | 9/2000 | Shimada et al. ............ | 701/201 |
| 6,333,702 | B1 * | 12/2001 | Hiyokawa et al. ..... | 340/995.21 |

* cited by examiner

*Primary Examiner*—Gertrude A. Jeanglaude
(74) *Attorney, Agent, or Firm*—Antonelli, Terry, Stout & Kraus, LLP.

(57) ABSTRACT

Disclosed is a arrangements of map information supply device for mobile units.

18 Claims, 10 Drawing Sheets

S411.
CORRECT THE LONGITUDE COMPONENT AND SET WIDTH AT BOTH ENDS.

S412.
CREATE ARC AT BEND POINT.

S413.
APPROXIMATE THE ARC INTO A CORRECTED N SHAPE.

FIG. 4B

S411. PROCESSING TO CORRECT LONGITUDE COMPONENT.

- POINT OBTAINED BY APPLYING PREDETERMINED WIDTH.
- POINT AFTER CORRECTION
- POINT OBTAINED BY APPLYING PREDETERMINED WIDTH.

$L = \{\Delta x^2 + \Delta y^2\}^{1/2}$ ---------- (FORMULA 421)

$L' = \{(\cos\theta * \Delta x)^2 + \Delta y^2\}^{1/2}$ ---------- (FORMULA 422)

HERE $\theta$ IS THE LATITUDE (OR A TYPICAL VALUE FOR LATITUDE)

OR, $L' = \{(k * \Delta x)^2 + \Delta y^2\}^{1/2}$ ---------- (FORMULA 423)

HERE, k IS THE COEFFICIENT DETERMINED BASED ON THE LATITUDE.

| LATITUDE | TYPICAL VALUE FOR LATITUDE |
|---|---|
| 35° ~ 40° | 37.5° |
| 40° ~ 45° | 42.5° |
| 45° ~ 50° | 47.5° |
| ⋮ | ⋮ |

| LATITUDE | COEFFICIENT k |
|---|---|
| 35° ~ 40° | 0.79 |
| 40° ~ 45° | 0.74 |
| 45° ~ 50° | 0.68 |
| ⋮ | ⋮ |

FIG. 6A

ROAD TABLE ~610

| ID | TYPE | COORDINATES | NAME |
|---|---|---|---|
| 1001 | NATIONAL HIGHWAY | {(22, 141), ..., (34, 244)} | NO. 20 |
| 1002 | METROPOLITAN ROUTE | {(34, 562), ..., (233, 984)} | FUCHU ROUTE |
| 1003 | CITY LOAD | {(859, 349), ..., (83, 909)} | |
| ... | ... | ... | ... |

FIG. 6B

POI TABLE ~620

| ID | TYPE | COORDINATES | NAME |
|---|---|---|---|
| 2001 | GS | (234, 533) | SO-AND-SO GASOLINE STAND |
| 2002 | SHOP | (163, 499) | ABC STORE |
| 2004 | SHOP | (3, 300) | BURGER SHOP |
| ... | ... | ... | ... |

FIG. 6C

LANDSCAPE TABLE ~630

| ID | TYPE | COORDINATES | NAME |
|---|---|---|---|
| 3001 | LAKE/MARSHES | {(22, 141), ..., (34, 244)} | YAMANAKA LAKE |
| 3002 | PARK | {(34, 562), ..., (233, 984)} | NATIONAL PARK |
| 3003 | RAILWAY | {(859, 349), ..., (83, 909)} | CHUO LINE |
| ... | ... | ... | ... |

<PRESENT INVENTION>
COMPARE CELL MAP DATA TO SECTION FIGURE DATA.

FIG. 10A

<CONVENTIONAL>
COMPARE CELL MAP DATA TO SEARCH AREA FIGURE DATA.

MAP INFORMATION SUPPLY DEVICE FOR MOBILE UNITS

FIELD

The present invention relates to map information supply arrangements (device, method, implementations) for a map information service for a mobile unit.

BACKGROUND

Among systems for displaying maps to a destination, there are systems for extracting and displaying map information of areas along a route to the destination (e.g. JP-A No. 314634/2000). There is also a technology for setting a user-designated area range for map information extraction so that area includes a geographic point specified by the user (JP-A No. 12962/2001).

Map information is generally stored in rectangular coordinates on a recording medium. However the actual surface of the earth is spherical so even if extracting a pre-established area with a designated width from the route, a longitudinal error may occur due to the route latitudinal position. In other words, the related art had the problem that map information may be extracted in a narrower or wider range than the desired location for display.

When extracting information of specified area based on the shape of the road centerline along the route, a polygon representing that area may possess a lot of vertexes. So one background system needs an extremely large amount of time for judgment processing of information in an internal unit of the area from the recorded map information. Then it may be difficult to achieve enough performance to handle practical service needs.

Further, standard map information provided only for peripheral areas on the established route and may not include information such as rest stops and side-trip points along the way. The user therefore may have to once again make a search to obtain the desired information. A method is available for providing detailed map information by enlarging an area specified by the user on the map displaying the route. However no area suggestion is provided by this method, so the user may have to deal with the troublesome task of selecting an appropriate area allowing supply of detailed map information.

DETAILED DESCRIPTION

Figure 1:
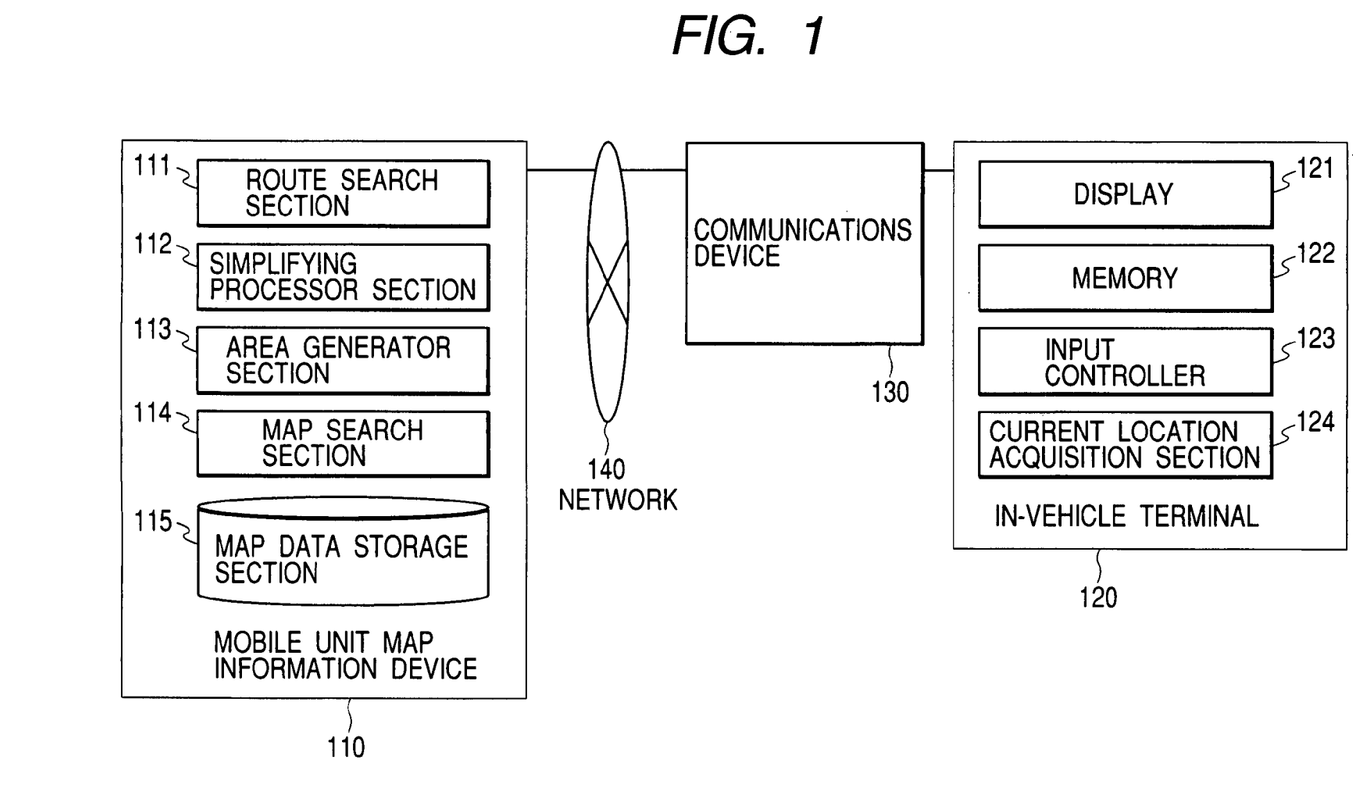
FIG. 1 is a block diagram showing one example of a structure of the map information service device.

The example embodiments of the present invention are described next based on the drawings, although practice of present invention is not limited to such examples. FIG. 1 is a drawing showing one example of a map information service, device for a mobile unit of one embodiment of the present invention. The map information service device 110 shown in FIG. 1, supplies map information over a network 140 such as the Internet, to the vehicle terminal 120 connected to a communication device 130 such as a cellular telephone.

The map information service device 110 receives information on at least two geographical points, such as a current location and a destination of the vehicle terminal 120. The route search unit 111 calculates the path between the two geographical points and the simplifying processor unit 112 makes a simplified line graph expressing the calculated route information. Next, the area generator unit 113 may find the area along the route based on the simplified route information output by the simplifying processor unit 112, and the map search unit 114 selects and outputs only the figure present within the area found from the map data storage unit 115 described later on. The map data storage unit 115 may record and manage the map data with a rectangular coordinate system. Here, the map search unit 114 may employ, for example, a database management system containing a spatial search function. The map data storage unit 115 is a recording medium such as a hard disk or a DVD. The map data storage unit 115 may be an external storage device connected over a network to the map information service device.

The vehicle terminal 120 is for example a car navigation device. The vehicle terminal 120 may include a display 121 such as a liquid crystal display, a memory 122 such as a hard disk or Compact Flash (registered commercial trademark), an input controller 123 for controlling information input by the user using for example a touch screen, and a current location acquisition unit 124 for acquiring the current location from a GPS, etc. The user may select a destination displayed on the display 121 by the input controller. The map information distributed from the map information service device 110 based on the acquired current location and destination may be temporarily stored in the memory 122, and the map information is shown on the display 121.

Figure 6A:
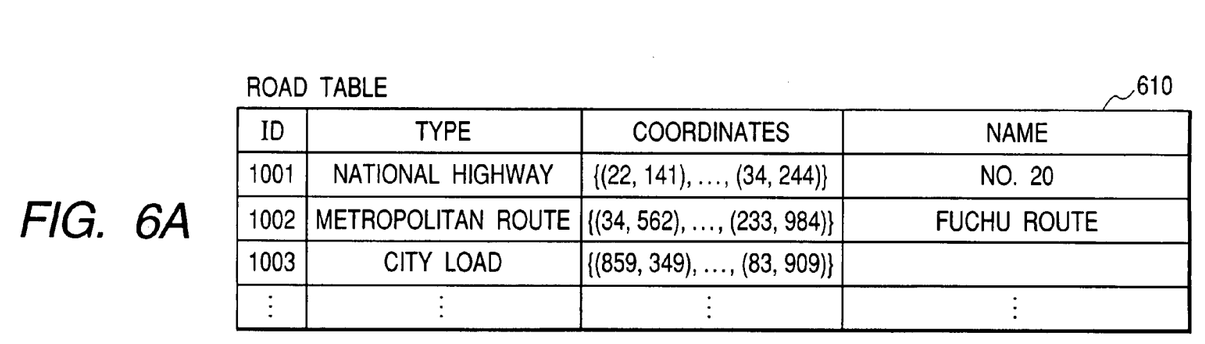
FIG. 6A shows one example road table among the map information management tables.
Figure 6B:
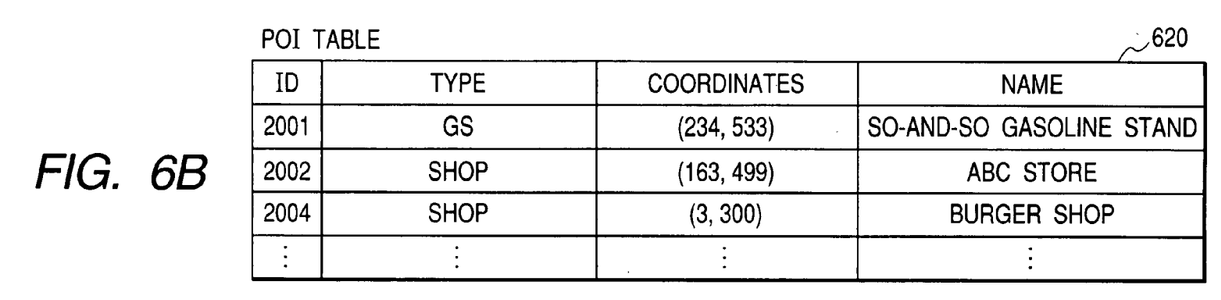
FIG. 6B shows one example POI table among the map information management tables.
Figure 6C:
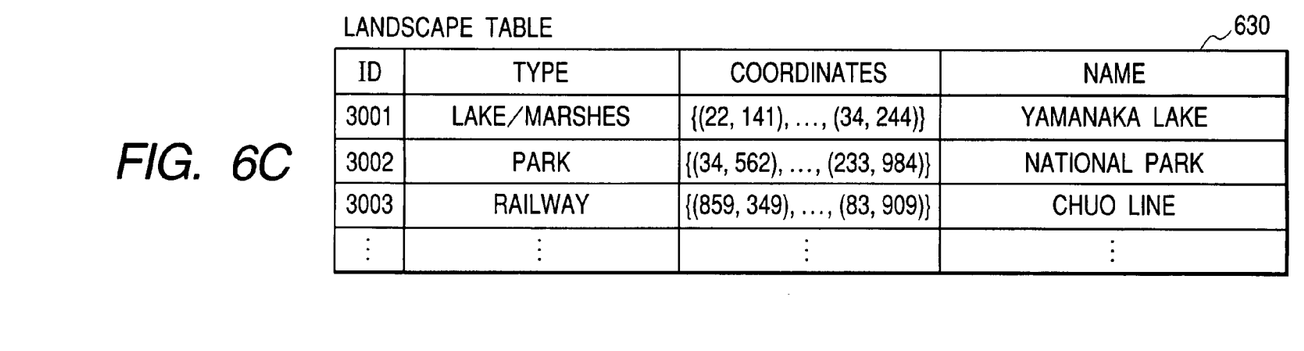
FIG. 6C shows one example landscape table among the map information management tables.

In the following description, the map information service device 110 and the vehicle terminal 120 are each started up, and both are connected by way of the network 140 and communication device 130. A respective controller processor unit operates each unit in these two devices. The operation method may be stored on a recording medium and loaded by software program, or hardware, or interaction by both the software and hardware. The one example of a data structure in the map data storage unit 115 is described next using FIG. 6A–6C. In FIG. 6A–6C, road data, POI data such as stores, and landscape data such as parks and water areas are defined and stored in a table in a database management system.

The road table 610 may define an ID for identifying the road data, the type of road, and the coordinate string for expressing a centerline of the line graph and road names. And it manages these data in a table structure.

The POI table 620 and landscape table 630 may in the same way, define the respective ID, types, coordinate value (string) expressing the position and polygon area, and names, in a table structure of terms, and manage this POI data or/and landscape data.

Figure 2:
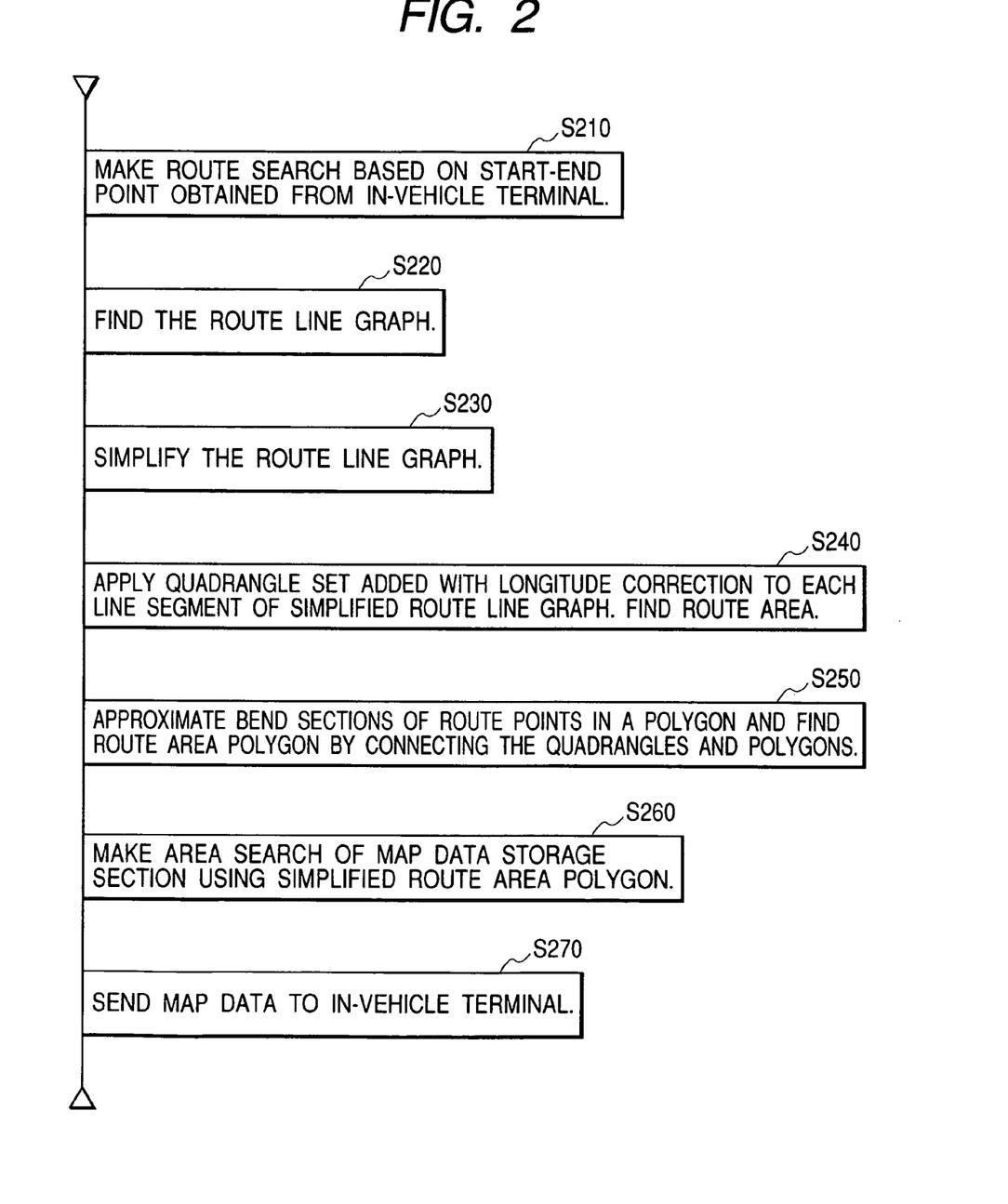
FIG. 2 is an example flow chart showing the process for supplying the route map information.

FIG. 2 is a drawing showing one example process in the map information service device 110 for extracting and supplying maps for the road area. This process flow is described next while referring to FIG. 1 and FIG. 2.

First of all, the operator sets the destination by making an entry using the input unit 123. And the current location acquisition unit 124 acquires information on the current location of the vehicle terminal 120. The current position is now set as the start point, and the destination may be set as the end point. Information on designated location may be used regardless of the current position, and information on an optional geographic point may be set as the destination rather than the final destination. Information on a intermediate stop points may, of course, also be set and may be used in the following route search. The start-end point information and intermediate stop points information is sent from the vehicle terminal 120 to the map information service device 110 by the communication device 130 and the network 140.

The route search unit 111 in the map information service device 110 makes a route search based on the received start-end points and intermediates points, and finds the route between the start-end points (S210). The route search may consequently yields a list of data arrayed in the sequence of the route from start point to end point and a list of forward-reverse flags showing whether or not the coordinate string for each road data matches the route direction. The forward-reverse flags are information showing whether the points of the road data coordinate strings are arrayed in a direction matching the route direction, or in a reverse sequence not matching that direction. A minimum route search utilizing for example, Dijkstra's Algorithm (shortest path) may be applied as the route search processing.

Next, the area generator unit 113 may search of this road data list in sequence starting from the top (beginning) while complying with the forward-reverse flags for each road data. If the flag is in the reverse direction not matching the route direction, then the order of those coordinate string points is reversed. Next, the edge points of the road data coordinate string arrayed in a list may be connected in a route sequence to find a line graph made up of one continuous route (S220). The line graph thus obtained may then be changed to a simplified route line graph in the simplifying processor unit 112 by thinning out the non-characteristic points (S230). The process for simplifying the route line graph is described later in detail using FIG. 3.

The width processing might be done by applying a quadrangle with longitude correction to each segment of the simplified route line graph in the area generator unit 113 (S240). Next a bent section in a route line, in other word a cross point of the rectangular, are joined by circular arc or some other geometrical shape. Then simplified route area may be determined by approximating the figure by polygon and connecting the quadrangles (S250). This width processing and route area polygon creation are described later in detail in FIG. 4A–4B and FIG. 5A–5B.

The map search unit 114 extracts the simplified route area determined in the above process, from the map data storage unit 115 (S260). In this step, the map search unit 114 may implement a spatial search using an SQL format inquiry language recorded with conditions for the polygon showing that simplified route area in the table containing the map information. As a result, the collective map data such as the road data and landscape data, and POI data present inside the polygon expressing the simplified route area as the condition may be obtained. The map data for the area along the route obtained by the above processing, is output by way of the communication device 130 over the network 140 to the vehicle terminal 120 (S270). The map is displayed on the on the vehicle terminal based on the received information.

One example of contents of the processing is described next. One embodiment of process (S230) for simplifying of the line graph for the route in FIG. 2 is described first using FIG. 3.

The number of peak points (i.e., nodes) on the line graph showing the route may usually increase greatly according to the distance. For example, the number of elements of the road data list obtained as a result from the route search depends on the distance, and may sometimes range in the hundreds or thousands. In those cases, the number of points connected for a string of road data on the line graph of coordinate may reach a scale several times larger than that list. So when a spatial search is made to extract map data such as the road data, landscape data and POI data within the route area polygon with a width setting in the line graph for the obtained route, huge amounts of processing time may be required for the decision processing for the inclusion and intersection of the graph showing the route area polygon and map data coordinate values (string). These intersect and the inclusive decision processing are described in detail later on.

Figure 3:
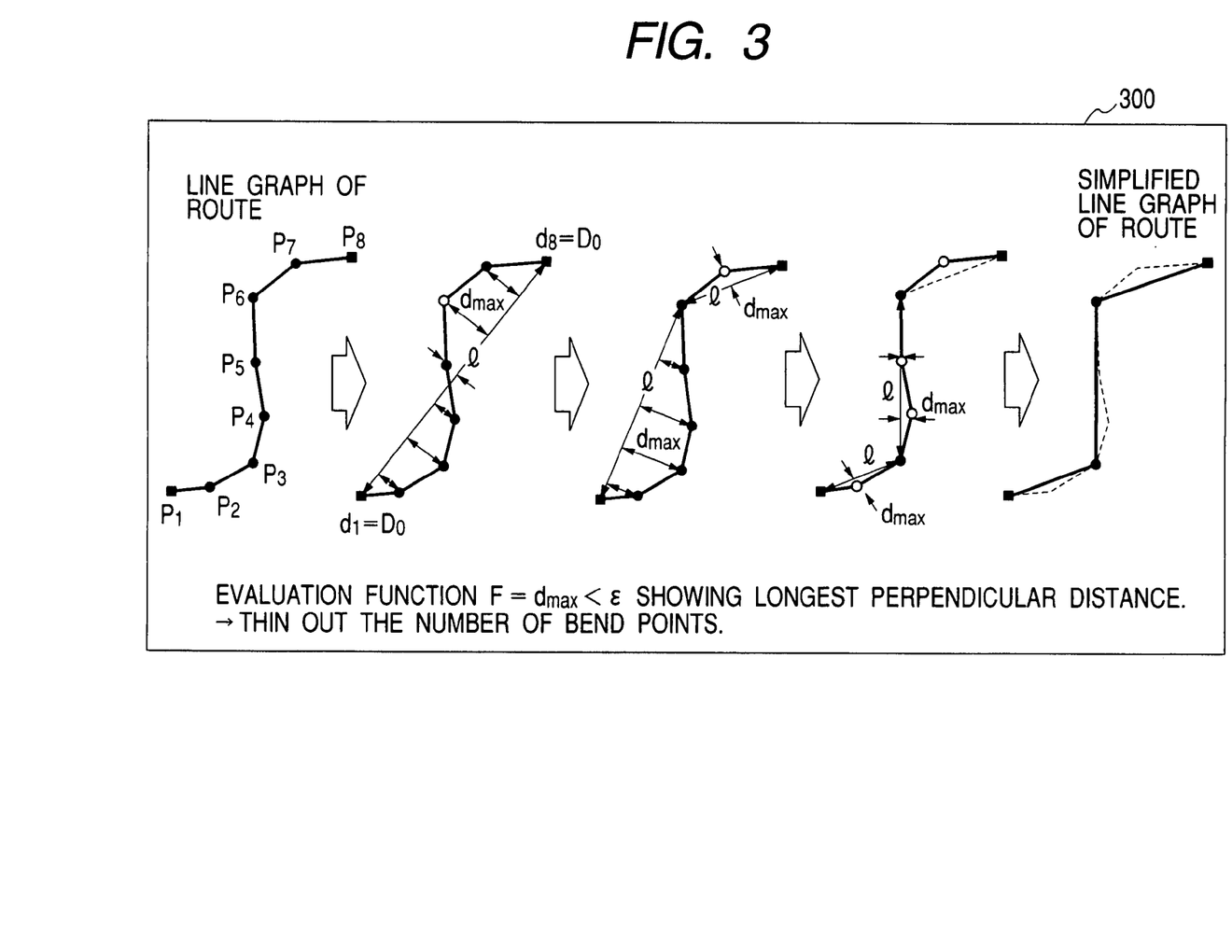
FIG. 3 is a drawing showing one example of a process for simplifying the route line graph.

In the spatial search in the present invention, the bend points (nodes) are reduced in number to simplify the line graph figure. More specifically, as shown in 300 of FIG. 3, a line segment joining the start-endpoints is found, and any nodes points Pn having the longest perpendicular line length extending from each node point to the line segment may then be found. The length of this perpendicular line is set as dn. In FIG. 3, the perpendicular line for point P6 is shown as having the longest perpendicular line, and such is taken as a further processing point. The line segment joining nodes point P6 and each of the start-end points is then found, and the nodes points having the longest perpendicular line dn is found. During the above example processing when the length of the maximum perpendicular line for any point Pn is smaller than a specified threshold value $\epsilon$, then that node point may be eliminated (see point P7, for example). By repeating this process, a simplified route line graph can be obtained (See the last figure in FIG. 3).

Besides the above example method, there is also a method for eliminating the edge points of a line segment, which is comprised in the line graph feature, having a shorter length than the established length threshold. A method may also be applied that eliminates the vertex of a line segment when it forms an obtuse angle to the vertex, or when that angle is larger than an established threshold. However, both of these cases may require adding the condition that a vertex must not be eliminated if the points where the line graph was changed after eliminating the vertex have shifted by an amount larger than a threshold value ε from the original line. This condition may prevent excessive simplification from causing deviations from the route area polygon found as the original route. Using a line graph simplified in the above ways may allow simplifying the route area.

Figure 10A:
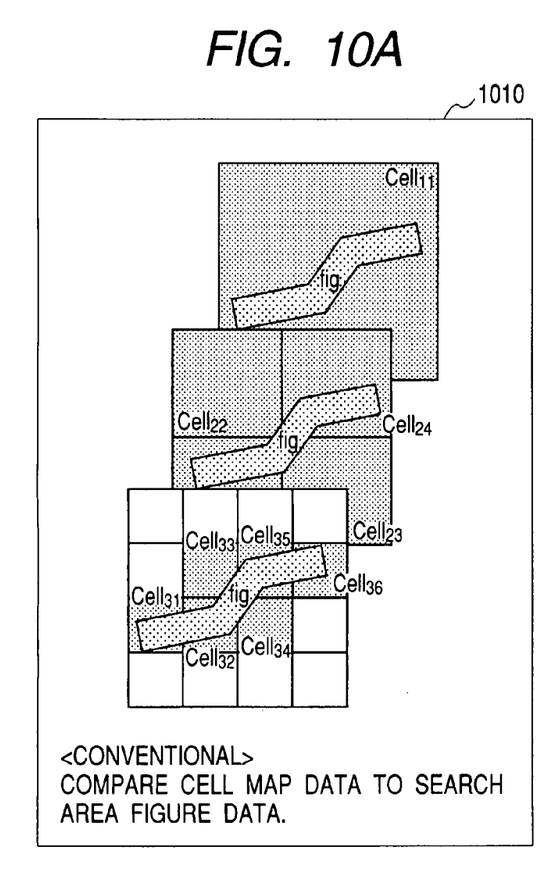
FIG. 10A is a drawing showing an example of a process for making a spatial search of the map search unit in the related art.

One embodiment of the spatial search process in FIG. 2 (S260) for extracting the road data, landscape data, and POI data in the route area polygon from the map data storage unit are described next using FIG. 10A–10B.

In the spatial search method, in order to efficiently search the polygon, the range of map data containing the road data, landscape data, POI data may be segmented into. rectangular areas called cells. And this method may manage the map data as individual cells, and may also use a layered structure based on the inclusive relation between cells. In this method, an inclusive determination is done firstly between cell and search area figure which require less load to narrow down the cells. Then determination between map information that belongs to the cell and search area figure are done. This may achieve an efficient finding of the applicable area.

One method as disclosed in the "HiRDB Spatial Search Plug-in Common Manual" by the Nichiwa Publishing Center, Document No. 3000-6-221, issued in April 2000, utilizes a technique called the quadtree method. In the quadtree method, the cells are created by dividing map into two vertical and horizontal segments, and this division process is repeated until the number of map data within all cells is within (less than) a specified threshold. In the process flow using this quadtree method, as shown by 1010 in FIG. 10A, the $cell_{ij}$ for a $layer_i$ intersecting the route area of the figure is found, and then a decision made whether the map data registered in each $cell_{ij}$ intersects or/and is included in the route area of the figure.

Figure 10B:
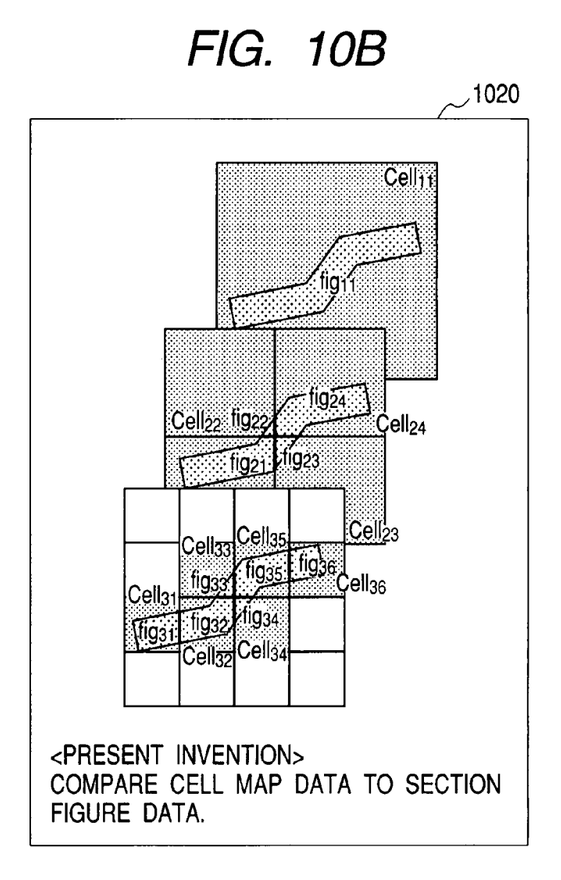
FIG. 10B is a drawing showing an example of a process for making a spatial search of the map search unit of the present invention.

A further improvement of this quadtree method may be described as shown in 1020 of FIG. 10B. Here, the search area figure is divided into $fig_{ij}$ sections at the cell boundary of each layer, and a comparison is made between cell map data stored in each cell (For example $cell_{ij}$) and the section fig data of the corresponding section fir (For example $fig_{ij}$). If overlap is found the data is included in the search area figure. Compared to the above method that require a process of p (the number of vertex within the entire fig) times q (the number of vertex of cell map data), this processing requires the process of $p_i$ (A smaller number of vertex in a smaller portion of the fig) times q. So this method may allow reducing the decision count by the ratio of the number of vertex points $p_i$ of section $fig_{ij}$, to the number of vertex points in the overall figure. This improvement may also extract map data at a higher speed than the quadtree method.

One embodiment of the intersecting and inclusive decision processing for the figure expressing the route area polygon and road data, landscape data, POI data coordinates (string) is described here. For example in the case of a line graph expressing a road data coordinate string, a check is made to find if line vertices are present within the polygon firstly, and a check is next made to find if the line segment of the line intersects with the polygon so that a decision may be made if the line is within the polygon or the polygon and the line intersect. In the case of a polygon expressing a coordinate string of landscape data, a check may be made the same as above at first, to find if the vertices for the landscape data polygon are within the polygon of the route area. Next, a check is made to find if each side of the landscape data polygon is within the route area polygon or intersects the route area polygon. In the case of a figure with points expressing POI data coordinates, a check may be made the same as above to find if the points are within the polygon. Utilizing these techniques may allow a reducing of the processing load when extracting map information and may also allow a providing of the desired map information to the mobile unit quickly.

Figure 4A:
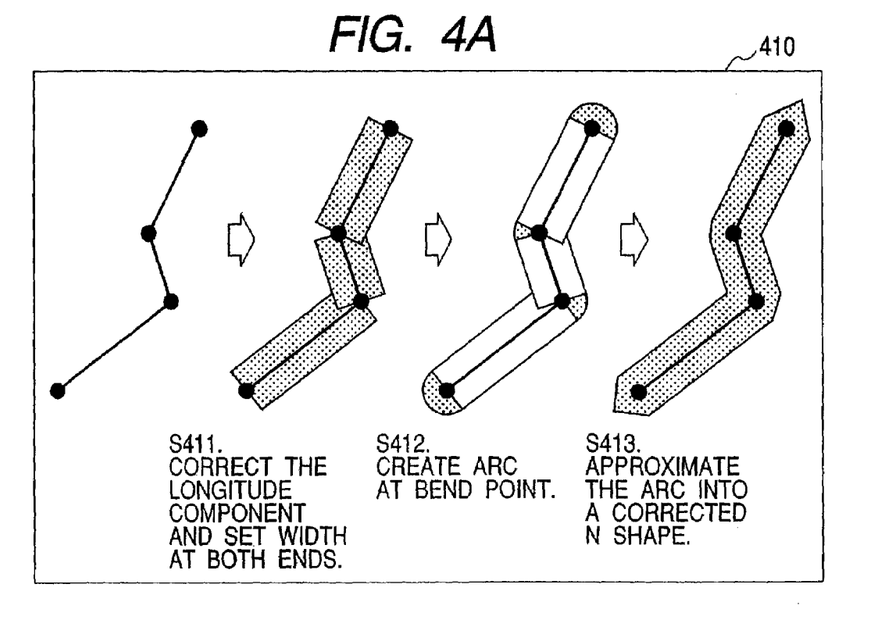
FIG. 4A is a drawing showing one example of a process for establishing the route area using quadrangles and joining arcs or other shapes.
Figure 4B:
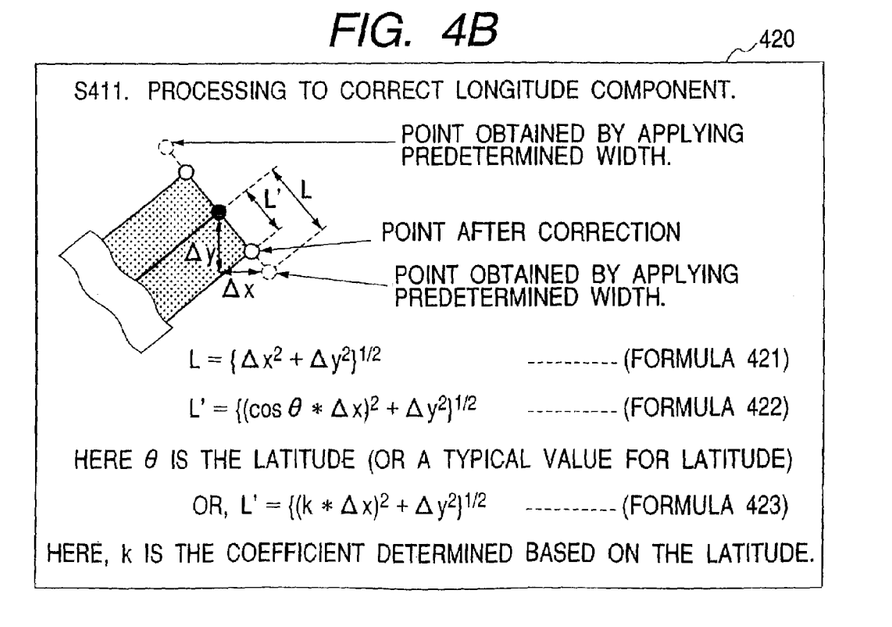
FIG. 4B is a drawing showing one example of a process for establishing the route area with longitudinal corrections added.
Figure 5A:
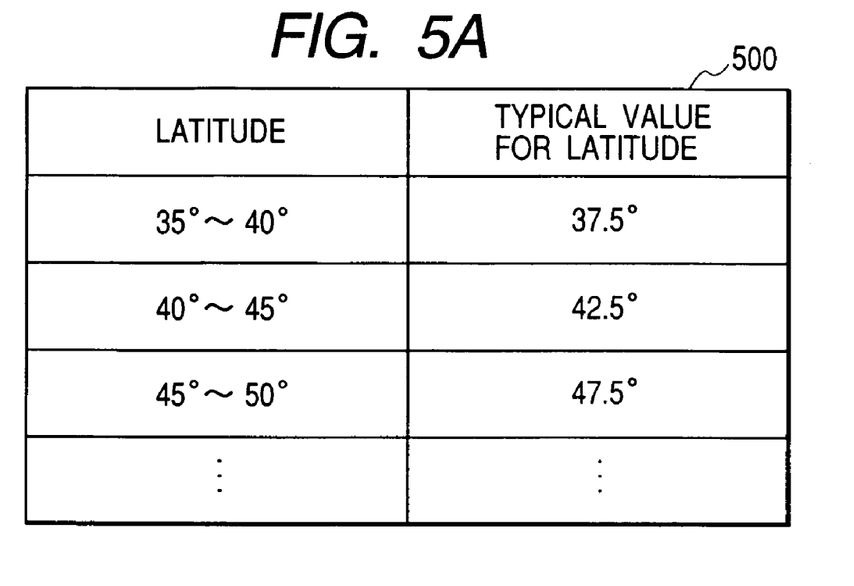
FIG. 5A is one example table of coefficients for correcting the longitude.
Figure 5B:
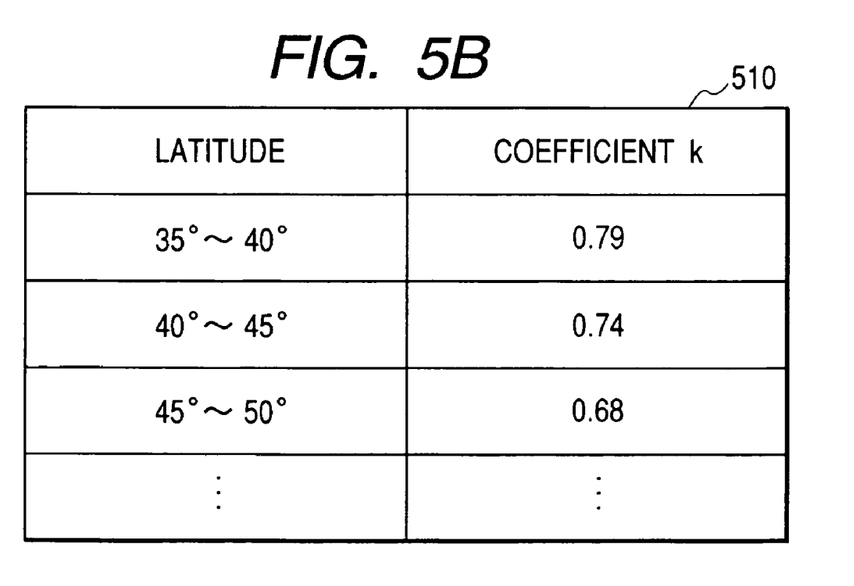
FIG. 5B is one example table of coefficients for correcting the longitude.

Next, an example of width processing added with latitude correction (S240,S250) of FIG. 2, is described using FIG. 4A–4B and FIG. 5A–5B. FIG. 4A–4B show, examples of a process for creating a polygon with a width setting added to the corrected longitudinal direction on the route line graph that was simplified as previously described. FIG. 5A–5B show an example of tables of coefficients utilized in correcting the longitude. The following description assumes that the map information vertical direction is the latitude and the horizontal direction is the longitude. The description also assumes that the coordinate values on the map data is expressed as a rectangular coordinate system based on the length of the equator.

In the polygon creation routine in the route line graph shown in 410 of FIG. 4A, a quadrangle (or square) may be applied to each line segment of the line (S411). This quadrangle is obtained by applying an area of equal widths to both ends of the line segment. Here the predetermined equal widths is L shown in formula 421.

$$L=\{(\Delta x)^2+\Delta y^2\}^{1/2} \qquad \text{Formula 421}$$

The width with the correction L' is then found by multiplying the horizontal component (Δx) of L by the cos θ based on the latitude θ as shown in 420 of FIG. 4.

$$L'=\{(\cos\theta*\Delta x)^2+\Delta y^2\}^{1/2} \qquad \text{Formula 422}$$

Here, multiplying the cos θ by the horizontal component Δx, corrects for the latitude θ of the horizontal component of the equator by multiplying the cos θ rate by the horizontal component. In other words, the size of the coordinate value is the actual length of the horizontal component for the natural equator so that making this correction may finds the actual length for latitude θ. The above area correction operations may be performed automatically.

Each latitude θ here may be found from a position of each of vertices on the line graph. However as shown in 500 of FIG. 5A, a typical value may be utilized that is established according to the latitude position in the figure. Further, instead of calculating the trigonometric function every time, a coefficient may be established according to the latitude position in the figure as shown in 510 of FIG. 5B to reduce the processing load for making the calculation of following formula 423.

$$L'=\{(k*\Delta x)^2+\Delta y^2\}^{1/2} \qquad \text{Formula 423}$$

In this way, after a longitudinally corrected square is applied to the line segment, an arc forming the radius of L' may be generated at the bend point of the line graph or in other words the vertex, and the intersection with the quadrangle may be found (S412). Finally, the arc may be approximated to a regular N angle, and the polygon obtained by connecting to the external circumference may be generated as the route area (S413).

By making longitudinal corrections according to the latitude in this way, map information may always be supplied in a suitable range to the map device.

The example in the above described embodiment example provides map information along a route from the current location to the destination, to the vehicle terminal from the map information service device. However, the information on facilities and shops distributed by this method may be limited to map information along the area of the route. So if the operator wished, for example, to search for a rest area such as a location even slightly separated from the route, and if that desired POI was not along the route, then the operator once again may have to inquire to the map information service device.

The example in another embodiment describes providing map information wherein the route area map information is expanded by adding information on POI to the map information in compliance with, for example, an expected or explicitly designated rest period and continuous driving periods stored in advance by the operator. Map information containing the rest area points along the driving route may in this way be provided automatically in advance to the vehicle terminal by a single operation along with map information on the route area.

Figure 7:
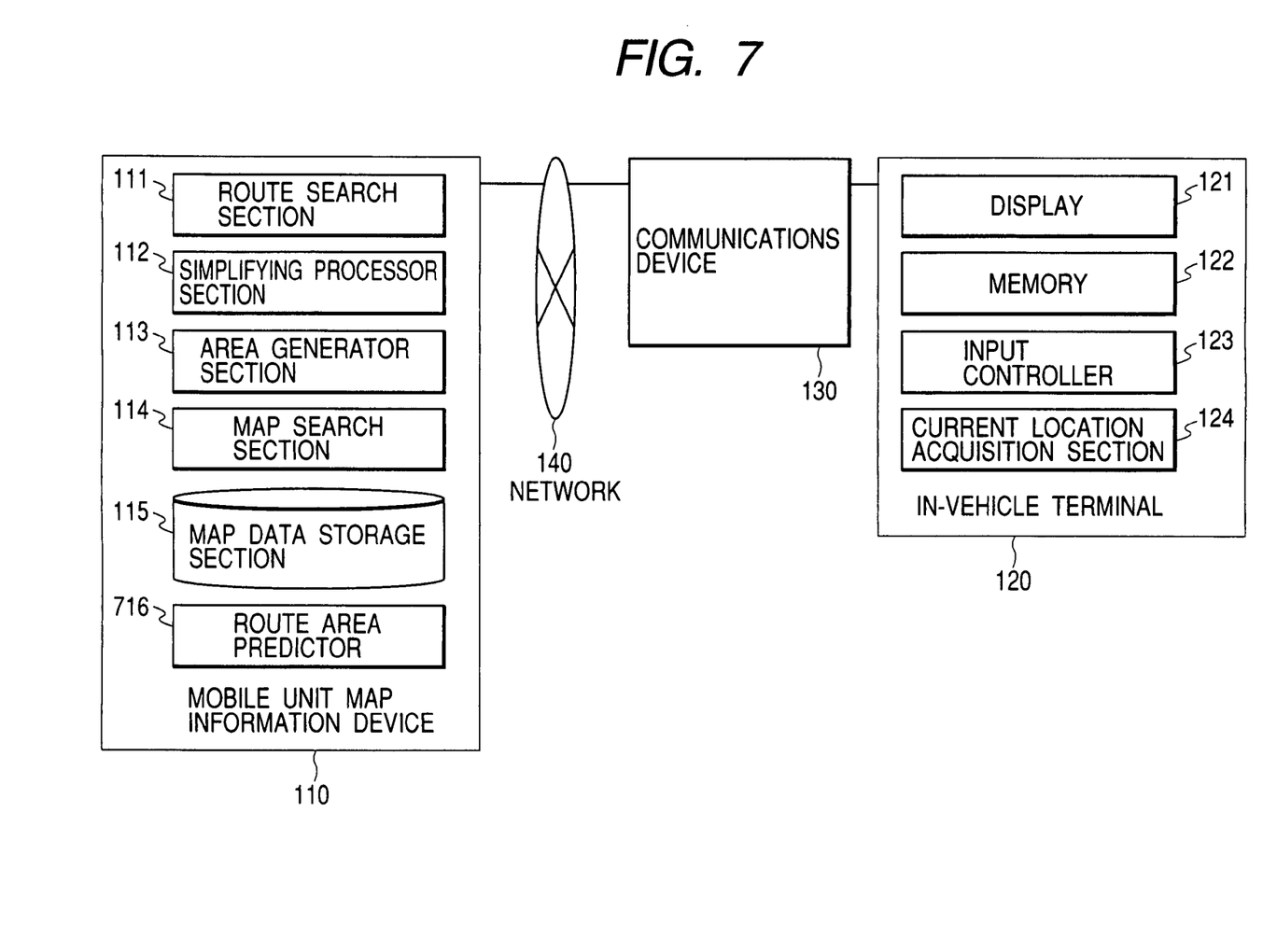
FIG. 7 is a block diagram showing another example map information service device

Accordingly, another embodiment is described next while referring to FIG. 7, FIG. 8 and FIG. 9. A block diagram of another example of a map information service device of the embodiment of the present invention is shown in FIG. 7. Components in common with the FIG. 1 embodiment are similarly numbered and not discussed again for sake of brevity. In the structure of this embodiment, an enroute area predictor 716 has been added to the map information service device 110 shown in FIG. 1.

Figure 8:
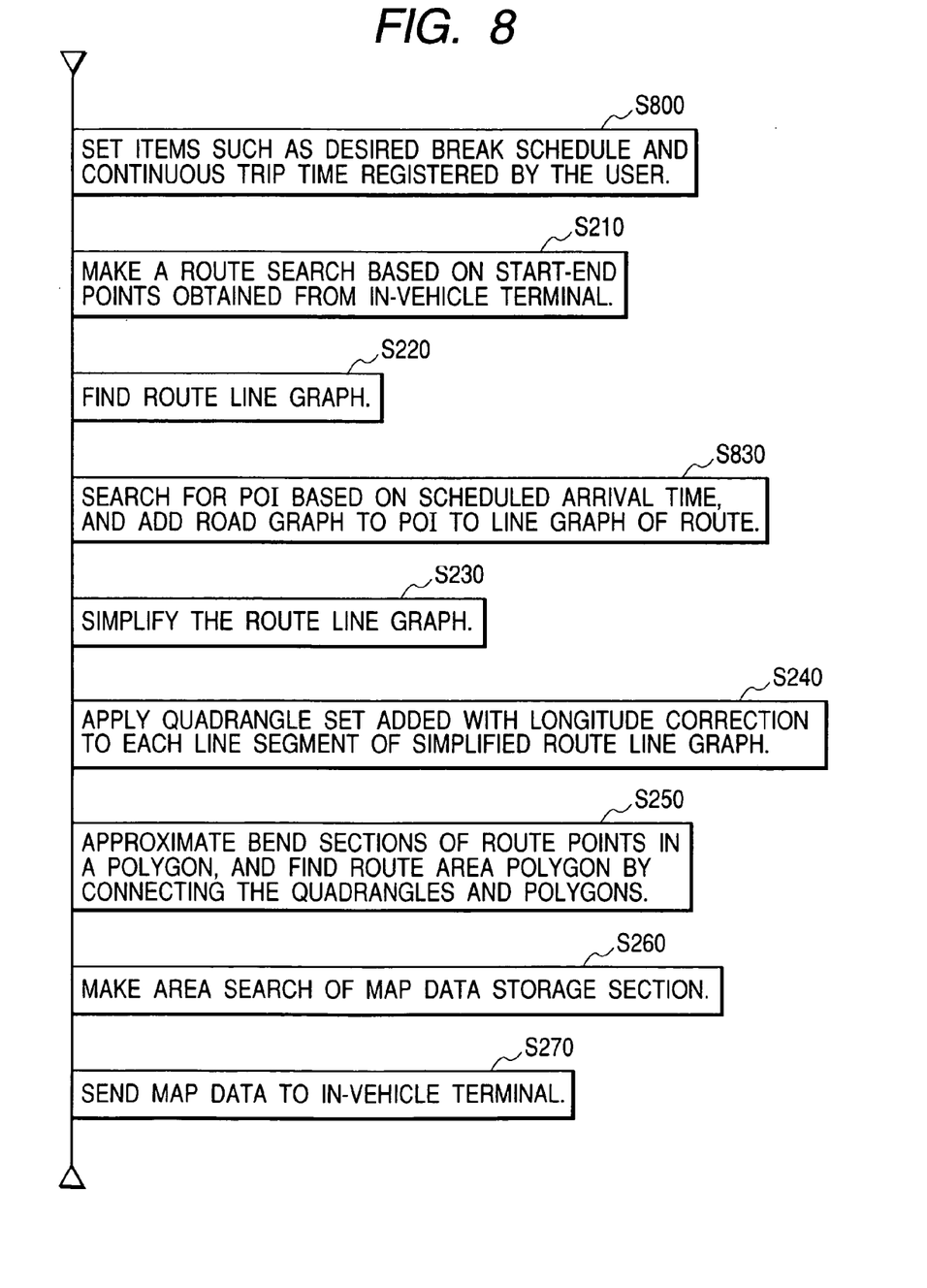
FIG. 8 is a flow chart showing another example process for supplying the route map information.

The process flow in the enroute area predictor 716 is shown in FIG. 8. Here, a user input process S800 A-D and a process S830 performed by the enroute area predictor 716 has been added to the process previously described for FIG. 2.

The user may first set (S800) the desired time for taking breaks or/and the continuous driving time in the device input unit (123). These settings may of course also be entered beforehand as defaults (reset values). S210 and S220 may be same with steps in FIG. 2. Next in S830, the scheduled break (rest) location points may be set based on the information such as scheduled arrival time calculated from the road information, the scheduled rest break times and the time that the route search request is output and/or continuous driving times stored beforehand by the user. The peripheral POI may be then extracted from the map data storage unit using this scheduled break location point as a reference. A line graph of the road to the POI extracted utilizing these geographic points along the road, is added to the line graph of the road found in S220.

Figure 9:
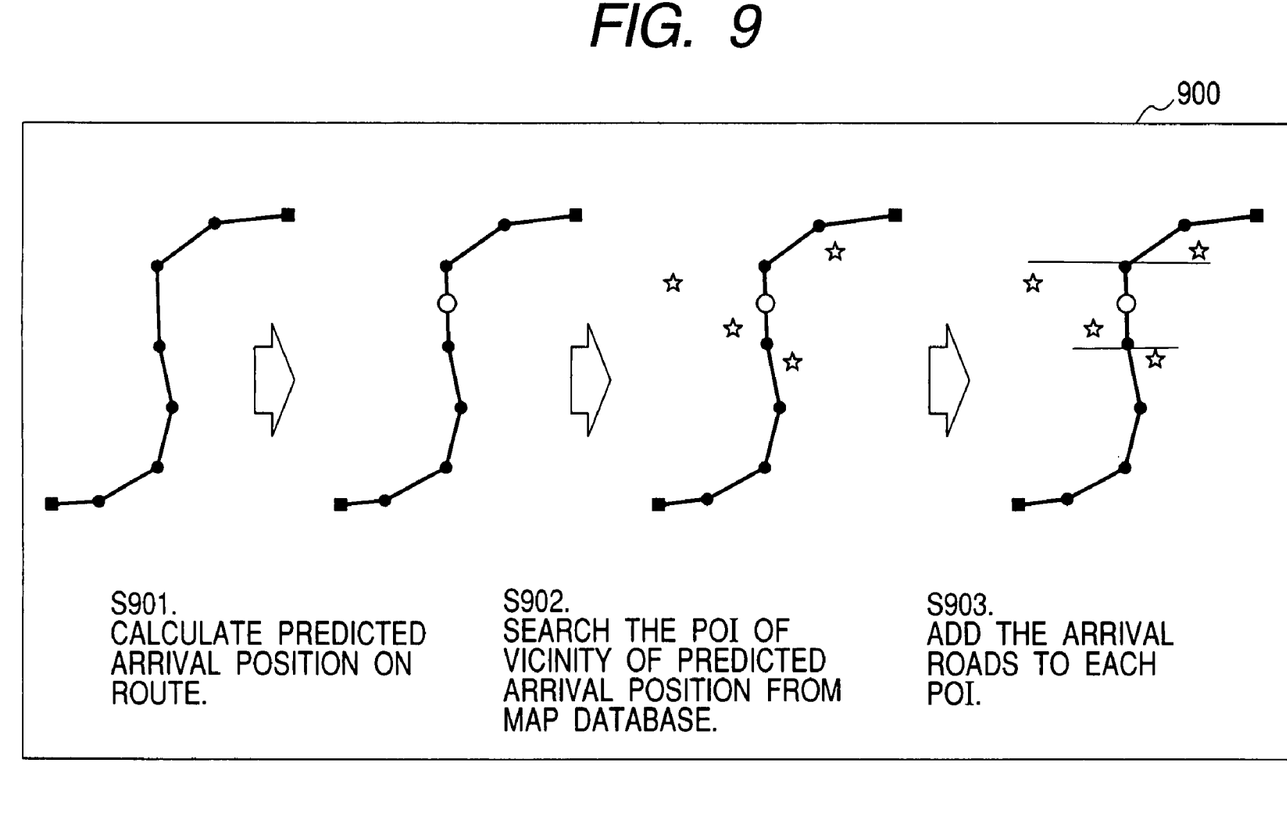
FIG. 9 is a drawing showing another example of a route map information supply.

The process in S230 is described in further detail using FIG. 9. In S901, the predicted arrival (location) point along the route is found (See hollow circle).

In the present embodiment, the designated time slot for arriving at a geographic points are found by finding the predicted trip time for each intersect point in sequence from the route length between each intersect point and the average driving speed established in the type category. Of course a more accurate time may be predicted by using time-influencing road information such as traffic jams. Next in S902, the POI is extracted from the map data storage unit (115) based on the estimated arrival position. This extracting of POI may be extracted by implementing a formula for a circular search process, whose center point is a POI of rest areas and restaurants stored in the map data storage unit, for extracting only the POI within the circle forming the radius in a suitable distance s. Finally, in S903, the expanded route map may be established by finding the road to each POI extracted from the route and adding this to the route road figure. The processing for S830 in FIG. 8 has now been described. The processing subsequent to S830 is the same as described using FIG. 2.

An effective method to determine the arrival time using this enroute area predictor may be a technique that establishes the POI search reference point on the route, based on the rest periods entered when setting the destination point, and the continuous drive time periods for the vehicle terminal entered ahead of time by the operator. The procedures for entering (storing) these conditions may be performed beforehand, or may be performed each time the destination is set. Another effective method may be to store information such as the continuous driving time for each individual driver (user) beforehand, and establish the POI search reference point based on the information stored for each driver (user). The mealtime rest break time periods for breakfast, lunch and dinner set as defaults may also be utilized.

Besides the above methods, the amount of remaining fuel in the vehicle may be acquired from the vehicle terminal when setting the route. Then the distance that can be driven may be calculated and reference points along the route may be found. Gas stations in the vicinity of these reference points may be extracted from the map data storage unit and this information provided along with the route map.

The user may obtain even better results for selection by using more detailed selection criteria. This criteria may be formed for example by designating categories such as fast-food shops or restaurants as the POI for the rest break, or setting up a menu storing for example western or oriental food in the case of restaurants, etc. The user convenience in terms of POI search range can be further increased by establishing an allowable detour range by setting an upper limit for the search radius when deviating from the route.

This embodiment therefore may allow extracting information on rest areas (for coffee, food, gas, etc.) in areas where an expected or probable rest break may be taken along the actual driving route, and supplying this information along with the route map information to the vehicle terminal. The operator may therefore acquire map information including information on potential stops and points of interest on the route and in this way receive effective route guidance. The user may further acquire area map information including POI for areas along the router reachable within the continuous drive periods and rest period times without the user having to perform the bothersome task of specifying points on the map. Then, the present invention speedily provides accurate map information matching user needs to a mobile unit. More specifically, the present invention establishes a suitable area compensated for latitude errors along the drive route of the mobile unit. And also alleviates the processing load for extracting map information by simplifying the extraction area to an extent not causing actual problems. The present invention may therefore provide a map information service device rugged enough to withstand actual service needs.

The invention disclosed in the present application may be constituted as follows:

A map information device for searching routes based on information acquired on two geographical points, and outputting map data for areas along the route.

A map information device to establish a route area corrected based on latitude values for that route set to a specified route width, when the map data in particular is based on rectangular coordinates.

A map information device to determine an area for making a map data search after simplifying said map data by simplifying the line graph of the area along the route by eliminating component points whose distance to next nodes are equal or less the predetermined value on that route.

A map information device containing an enroute area predictor to predict enroute points in the vicinity of the searched route, and extracting map data in a range wider than the range for points predicted as the vicinity of the enroute points.

One unique feature of the present invention is the ability to provide map information in a suitable and accurate range matching the user request, when extracting map information along the route of the mobile unit. The present invention is also able to alleviate a bandwidth load when supplying the maps.

In concluding, reference in the specification to "one embodiment", "an embodiment", "example embodiment", etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment or component, it is submitted that it is within the purview of one skilled in the art to effect such feature, structure, or characteristic in connection with other ones of the embodiments and/or components. Furthermore, for ease of understanding, certain method procedures may have been delineated as separate procedures; however, these separately delineated procedures should not be construed as necessarily order dependent in their performance, i.e., some procedures may be able to be performed in an alternative ordering, simultaneously, etc.

This concludes the description of the example embodiments. Although the present invention has been described with reference to a number of illustrative embodiments thereof, it should be understood that numerous other modifications and embodiments can be devised by those skilled in the art that will fall within the spirit and scope of the principles of this invention. More particularly, reasonable variations and modifications are possible in the component parts and/or arrangements of the subject combination arrangement within the scope of the foregoing disclosure, the drawings and the appended claims without departing from the spirit of the invention. In addition to variations and modifications in the component parts and/or arrangements, alternative uses will also be apparent to those skilled in the art.

What is claimed is:

1. A map information device comprising:
    a storage unit for map data recorded in a rectangular coordinate system based on a length at the equator where a vertical direction is a latitude and a horizontal direction is longitude;
    a route search unit for searching for a route based on information on two geographical points;
    an area generator unit to set an area along the route between the two geographical points by correcting a east-west width of the area by a factor based on latitude values of the routes; and
    a map search unit to then search for map data for the corrected width area and to output the map data of the corrected width area.

2. A map information device according to claim 1, wherein the correcting of the width of the area based on latitude values of the routes is conducted without correcting of a height of the area.

3. A map information device according to claim 1, wherein the map data pertains to topographical features of a spherical body, and wherein the correcting of the width of the area based on latitude values is conducted to compensate for longitudinal width changes present along a latitude direction, from an equator to pole of the spherical body.

4. A map information device according to claim 3, wherein a different width correction value is applied for correcting the width, for different ranges of latitude values.

5. A map information device according to claim 1, wherein a different width correction value is applied for correcting the width, for different ranges of latitude values.

6. A map information device according to claim 1, wherein the correcting of the width of the area based on latitude values of the routes, is conducted with a correction value which is different from a value used for any correcting of a height of the area.

7. A map information device connected to a terminal, comprising:
    a route search unit for searching for a route based on information for two geographical points from the terminal;
    a route area predictor for predicting enroute stopping points along the route based on the information from the terminal and position information of the searched route;
    an area generator unit to set a search area along the route and to expand the search area along the route in the vicinity of the predicted enroute stopping points; and
    a map search unit to then search for map data for the search area, which is expanded in the vicinity of the predicted enroute stopping points, from a map database and to output the map data for the search area expanded in the vicinity of the predicted enroute stopping points.

8. A map information device according to claim 7, wherein the route area predictor establishes the enroute stopping points based on a predicted trip time schedule along the route.

9. A map information device according to claim 7, wherein the route area predictor establishes the enroute stopping points based on remaining fuel value information received from the terminal.

10. A map information device according to claim 7, wherein the route area predictor establishes the enroute stopping points based on a specified rest break time period or a continuous driving time.

11. A map information device according to claim 7 comprising:
    a processor unit to simplify a line figure of the route by reducing a number of nodes consisting the route,
    wherein the area generator unit sets an area along the simplified route.

12. A map information device according to claim 11:
    wherein the processor omits the nodes whose distance to next nodes are equal or less than a predetermined value.

13. A map information device according to claim 8 comprising:
    a processor unit to simplify a line figure of the route by reducing a number of nodes consisting the route,
    wherein the area generator unit sets an area along the simplified route.

14. A map information device according to claim 7, wherein the map search unit subdivides said the expanded search area into multiple area units, and determines map data that intersects or is included in the expanded search area by subdivided area units.

15. A map information device according to claim 11, with the map data based on rectangular coordinates, wherein the area generator unit establishes the expanded search area by correcting a width of the expanded search area based on latitude values of the route.

16. A map information device according to claim 7, wherein the area generator unit extracts POI at the periphery of the predicted enroute stopping points and expands the search area along the route to include a route to the POI.

17. A map information device, comprising:
- a storaqe unit for map data recorded in a rectangular coordinate system based on a length at the equator where a vertical direction is a latitude and a horizontal direction is longitude;
- a route search unit for searching for a route based on information on two geographical points;
- an area generator unit to set an area along the route between the two geographical points by correcting a east-west width of the area by a factor based on latitude values of the routes; and
- a map search unit to then search for map data for the corrected width area and to output the map data of the corrected width area;
- wherein the map search unit subdivides the area into multiple area units, and determines map data that intersects or is included in the areas by the subdivided area unit.

18. A map information device, comprising:
- a storage unit for map data recorded in a rectangular coordinate system based on a length at the eguator where a vertical direction is a latitude and a horizontal direction is longitude;
- a route search unit for searching for a route based on information on two geographical points;
- an area generator unit to set an area along the route between the two geographical points by correcting a east-west width of the area by a factor based on latitude values of the routes; and
- a map search unit to then search for map data for the corrected width area and to output the map data of the corrected width area;
- with the map data based on rectangular coordinates, wherein the area generator unit establishes the area by correcting a width of the area based on latitude values of the route.

* * * * *